(12) United States Patent
Zhang et al.

(10) Patent No.: US 10,007,848 B2
(45) Date of Patent: Jun. 26, 2018

(54) KEYFRAME ANNOTATION

(71) Applicant: Hewlett-Packard Development Company, L.P., Fort Collins, CO (US)

(72) Inventors: Tong Zhang, Palo Alto, CA (US); Georgia Koutrika, Palo Alto, CA (US); Jerry Liu, Palo Alto, CA (US); Steven J Simske, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/559,020

(22) PCT Filed: Jun. 2, 2015

(86) PCT No.: PCT/US2015/033674
§ 371 (c)(1),
(2) Date: Sep. 15, 2017

(87) PCT Pub. No.: WO2016/195659
PCT Pub. Date: Dec. 8, 2016

(65) Prior Publication Data
US 2018/0082124 A1    Mar. 22, 2018

(51) Int. Cl.
*H04N 5/93* (2006.01)
*H04N 9/80* (2006.01)
*G06K 9/00* (2006.01)
*G11B 27/34* (2006.01)
*G06K 9/62* (2006.01)
*H04N 5/445* (2011.01)

(52) U.S. Cl.
CPC ..... *G06K 9/00744* (2013.01); *G06K 9/00718* (2013.01); *G06K 9/00765* (2013.01); *G06K 9/6253* (2013.01); *G11B 27/34* (2013.01); *H04N 5/44504* (2013.01)

(58) Field of Classification Search
CPC ............ G06K 9/0074; G06K 9/00718; G06K 9/6253; G06K 9/00765; G11B 27/34; H04N 5/44504
USPC ................ 386/278, 281, 282, 290, 262, 248
See application file for complete search history.

(56) References Cited

U.S. PATENT DOCUMENTS 6,560,281 B1    5/2003   Black et al.
8,744,869 B2    6/2014   Graff et al.
(Continued)

FOREIGN PATENT DOCUMENTS

WO    WO-2009113102 A2    9/2009

OTHER PUBLICATIONS

Jinjun Wang et al., 'A Novel Framework for Semantic Annotation and Personalized Retrieval of Sports Video', In: Multimedia, IEEE Transactions on (vol. 10, Issue: 3), Apr. 2008.
(Continued)

*Primary Examiner* — Robert Chevalier
(74) *Attorney, Agent, or Firm* — HP Inc. Patent Department

(57) ABSTRACT

Examples associated with keyframe annotation are disclosed. One example includes extracting a set of keyframes from a video presentation. A subset of the keyframes is selected to present to a user based on a user preference. Annotations are generated for the subset of the keyframes. The annotations are personalized to the user. The subset of the keyframes and the annotations are presented to the user.

15 Claims, 6 Drawing Sheets

(56) References Cited

U.S. PATENT DOCUMENTS

| | | | |
|---|---|---|---|
| 2004/0090462 A1* | 5/2004 | Graham | G06F 17/30017 |
| | | | 715/767 |
| 2005/0246625 A1* | 11/2005 | Iyengar | G06F 17/241 |
| | | | 715/230 |
| 2010/0005485 A1 | 1/2010 | Tian et al. | |
| 2011/0087703 A1 | 4/2011 | Varadarajan et al. | |
| 2011/0119587 A1 | 5/2011 | Joy et al. | |
| 2013/0163860 A1 | 6/2013 | Suzuki et al. | |
| 2013/0330055 A1 | 12/2013 | Zimmermann et al. | |
| 2013/0342486 A1 | 12/2013 | Xin et al. | |
| 2014/0344661 A1 | 11/2014 | Sipe et al. | |
| 2015/0024351 A1 | 1/2015 | Landwehr | |

OTHER PUBLICATIONS

Khurana, K et al, "Video Annotation Methodology Based on Ontology for Transportation Domain", Jun. 2013.

Tseng, BL, et al, "Video Summarization and Personalization for Pervasive Mobile Devices", Nov. 4, 2011.

\* cited by examiner

KEYFRAME ANNOTATION

BACKGROUND

Teachers use video presentations to preserve their instructions so, for example, their students can review the presentations on their own time. Video presentations are also used in other contexts as well (e.g., business). The presentations may include slides and live markings to the slides that accompany the presenter's voice over and/or recorded interactions (e.g., a video feed of the presenter). Because many people retain information using differing techniques, some people may benefit from having a medium on which they can take notes related to the presentation.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
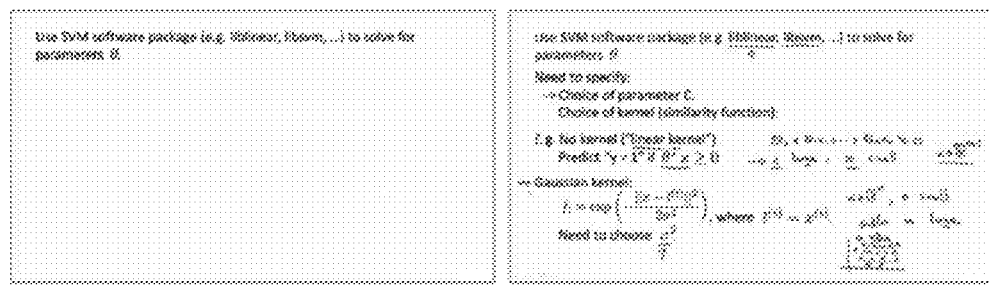
FIG. 1 illustrates example video presentation frames, on which example systems, and methods, and equivalents, may operate.
Figure 1:
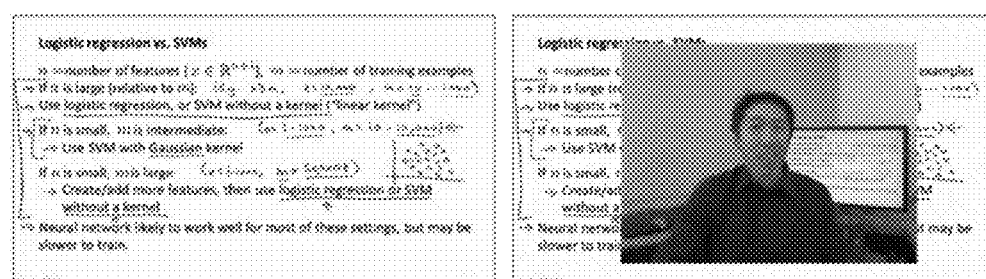
Figure 1:
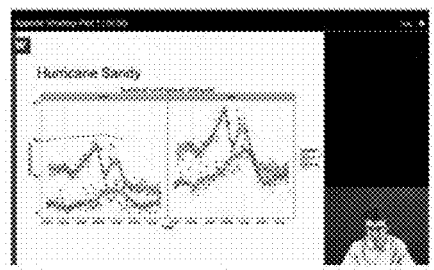

Systems, methods, and equivalents associated with keyframe annotation are described. Technology continues to invade various aspects of our lives, and the classroom has not escaped advancements derived from new devices, tools, and research. One manner of teaching that has become increasingly used is video presentations. Video presentations are targeted both at elementary concepts (e.g., basic arithmetic), and advanced ideas (calculus and beyond). Companies are developing modules that can span broad curricula (e.g., Khan Academy), and entire courses have moved online with schools like Stanford, Massachusetts Institute of Technology, and Harvard offering complex lecture series directly to students through massively open online courses.

However, many students learn via different techniques, not all of which may be adequately addressed by simple video presentations. Further, when it comes time to review course materials (e.g., for an exam), going through entire videos may be time consuming and inefficient. Additionally, it may be desirable to provide students with media related to video presentations that summarize video presentation content as well as providing space for students to take notes. Taking into account individual students' preferences, learning styles, and past behavior may further enhance the utility of learning aides derived from video presentations to the respective students.

Thus, personalized annotated keyframes may be generated for students for a video presentation. A video presentation, as used herein, is a video characterized by a series of segments directed towards individuals (e.g., students) for the purpose of teaching the individuals some topic, training the individuals in some skill, and so forth. Many video presentations may be characterized by a series of presentation slides that illustrate content discussed in the video presentation. The slides may be advanced by, for example, an instructor as the instructor explains subject matter displayed in the slides. The instructor may also annotate the slides as the instructor discusses the slides in the video presentation to highlight content in the presentation slides, add information to the presentation slides, and so forth. Video presentations may also be used in business scenarios, and for other purposes.

To create the annotated keyframes, keyframes for the video presentation are identified. In various examples, the keyframes may be selected based on clear cuts in content areas from the video presentation. Clear cuts may be points in the video presentation where content substantially differs between two consecutive frames of the video presentation. By way of illustration, in a film, a clear cut may occur as a result of a transition between scenes in the film or a transition between a shot of a scene in the film and another shot of the scene from a different angle. In a video presentation, a clear cut may be a result of a transition between two different presentation slides, a transition between overlays in the video presentation, and so forth.

Identifying clear cuts in a video presentation may facilitate identifying capstone keyframes of the video presentation. When keyframes are identified for, for example, films (e.g., movies, TV shows), keyframes associated with the beginning of scenes are often selected. However, keyframes for video presentations may be more useful when they contain more content. Because, during a video presentation, content may be added to a slide over time (e.g., by a presenter advancing the side to add more content to the slide, by a presenter annotating a slide), keyframes taken from the end of discussion of a slide may be preferred. Consequently, a capstone keyframe is a keyframe taken from a point in the video presentation where discussion of a presentation slide is substantially completed.

Once keyframes are selected (e.g., capstone keyframes), a subset of the keyframes may be selected to provide to a user based on that user's personal preferences. Additionally, annotations for the keyframes selected for that user may be generated, again based on user preferences, prior user behavior, and so forth. The annotations and keyframes may then be presented to the user.

FIG. 1 illustrates example video presentation frames on which example systems and methods, and equivalents, may operate. It should be appreciated that the items depicted in FIG. 1 are illustrative examples and many different features and implementations are possible.

FIG. 1 illustrates several example frames of example video presentations. The frames illustrate various examples of the types of frames that may be detected over the course of analyzing a video presentation for the purpose of identifying keyframes and providing annotated keyframes to users. Unless stated otherwise, the frames may have no relation to one another and may come from different video presentations.

Frames 100 and 115 illustrate examples of content associated with a single presentation slide taken at two points during a video presentation. Frame 110 depicts an earlier state of the presentation slide, and frame 115 illustrates a later state of the presentation slide. In various examples, frame 100 may be a state of the presentation slide immediately after a presenter advances to the presentation slide, and frame 115 may be a state of the presentation slide just before the presenter advances from the presentation slide.

Thus, frame 110 may follow a clear cut to the presentation slide, and frame 115 may precede a clear cut from the presentation slide. There may be many different techniques for detecting clear cuts in a video presentation. Detecting clear cuts may be useful for distinguishing between incremental changes being made to a slide, versus a sudden transition to a new slide. Many techniques may be appropriate for detecting clear cuts in a video presentation.

For example, color histograms may be made and compared for adjacent frames. When color histograms between two frames in a video presentation exceed a threshold, a clear cut may be considered to have occurred between the two frames. The threshold may be predefined or adaptive. An adaptive threshold may be based on a detected size of changes in histograms of frames over time. In another example, template subtraction techniques may be applied to detect clear cuts in a video presentation. Template subtraction may involve subtracting contents of a frame from a prior frame to detect whether changes to the frame are local to one area of the frame, or change a large portion of the frame. Grid analysis techniques may also be applied to identify clear cuts in a video presentation. Grid analysis may operate by dividing a video presentation into sections and detecting how many of the sections change between two frames. In some examples, grid analysis may be combined with other clear cut detection techniques. Consequently, changes in sections may also be analyzed using, for example, histogram analysis. In some examples, detecting clear cuts may attempt to account for misalignment between two frames. For example, if the video presentation is of a recorded projection, if the projector is bumped between two frames, accounting for misalignment may avoid inadvertently detecting as keyframes, frames in the middle of a discussion of a presentation slide.

As can be seen in frames 110 and 115, frame 115 includes more content than frame 110. This content may include a final state of the prepared presentation slide (e.g., after all text has been unhidden, after animations have completed), as well as annotations to the slide made by the presenter over the course of discussing the presentation slide. Consequently, frame 115 may be more useful to a person reviewing subject matter discussed in the video presentation than frame 110 because frame 115 includes more content. Consequently, selecting frame 115 as a potential keyframe to be annotated and/or provided to users may be preferable to selecting frame 110. Thus, frame 115 may be a capstone keyframe because after advancing from frame 115, discussion of the slide depicted in frame 115 may be substantially complete. Discussion of a presentation slide being substantially complete refers to a point in a video presentation after which a presenter moves on from discussing that presentation slide to further content. The presenter may, however, return to that discussion slide later briefly to, for example, address a question related to the presentation slide, review a concept shown in the presentation slide, relate content of the presentation slide to later content in the video presentation, and so forth. As discussed above, capstone keyframes may be identified by detecting clear cuts in a video presentation and selecting frames just preceding the clear cuts.

Frames 120 and 125 also illustrate frames of a video presentation involving discussion of a single presentation slide. Frame 120 depicts a frame of the video presentation where content of the presentation slide is the primary subject matter depicted in the frame. Frame 125 depicts a frame where a presenter has overlaid a video of himself over the content of the presentation slide. As can be seen, the static image of frame 125 contains less slide content than that of frame 120 because the image of the presenter blocks the content of the slide being discussed. Consequently frame 120 may be more useful as a keyframe provided to a student than frame 125.

Depending on techniques used for selecting keyframes, both frames 120 and 125 may be identified as potential capstone keyframes. This may be because, for example, enough pixels change between frame 120 and the overlaid presenter being added to a subsequent frame, as well as between frame 120 and the overlaid presenter being removed from a subsequent frame. Consequently, facial recognition, or other techniques may be used on frames identified as capstone keyframes to remove keyframes prominently featuring a person from the set of keyframes to potentially provide to a user.

However, performing facial recognition on capstone keyframes may not be an effective method for certain types of video presentations. For example, frame 130 illustrates a frame of a video presentation having several different content areas. In frame 130, presentation slides are on the left, a video feed of the presenter is in the lower right, and a blank content area is in the upper right. Other configurations of content areas are also possible.

In some examples, clear cuts may be detected when presentation slides advance (e.g., due to a number of pixels changing at one time). However, due to the unchanging area in the upper right in this example, and the limited changes occurring in the lower right, detecting clear cuts in the presentation slides may be difficult. Further, eliminating as potential keyframes, frames that pass facial recognition may exclude each keyframe because the video feed of the presenter may appear in each keyframe. Consequently, detecting and classifying different types of content areas may facilitate both identifying when slides advance, as well as avoiding rejecting frames that happen to contain a non-featured person. Classifying content areas may facilitate identifying slides advance by, for example, limiting clear cut detection to content areas of a video presentation actually containing presentation slides. Classifying content areas may facilitate avoiding rejecting frames that contain a non-featured person by identifying portions of a video presentation to ignore when performing facial recognition. Further, when keyframes and annotations are presented to users, it may be appropriate to crop keyframes to content areas of the keyframes that contain the presentation slides to enhance value of the keyframes to the users.

Once a set of keyframes (e.g., capstone keyframes) have been selected, personalization of the keyframes, and annotation of the keyframes may begin. First, the set of keyframes actually presented to a user may be personalized to that user. The personalization may be based, for example, on settings dictated by that user, past user behavior, and so forth. By way of illustration, the user may specify a preferred number of keyframes, a density of keyframes, and so forth. The user may also specify types of keyframes to be included. For example, some users may prefer keyframes having foundational principles, while other users may prefer keyframes associated with examples. Other techniques for pruning or increasing the number of keyframes provided to personalize the keyframes to users may also be appropriate.

Once keyframes have been personalized for a user, annotations to be provided to the user along with the keyframes may also be generated. As with the specific keyframes provided, the annotations provided may also be personalized to that user (e.g., based on user settings, based on past user behavior, user interactions). The actual annotations provided to the user may be provided from a variety of sources. For example, the annotations may be generated from notes generated by the user, notes generated and/or recommended by other users, slide content, speech to text of content from the video presentation, and so forth.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include one or more gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
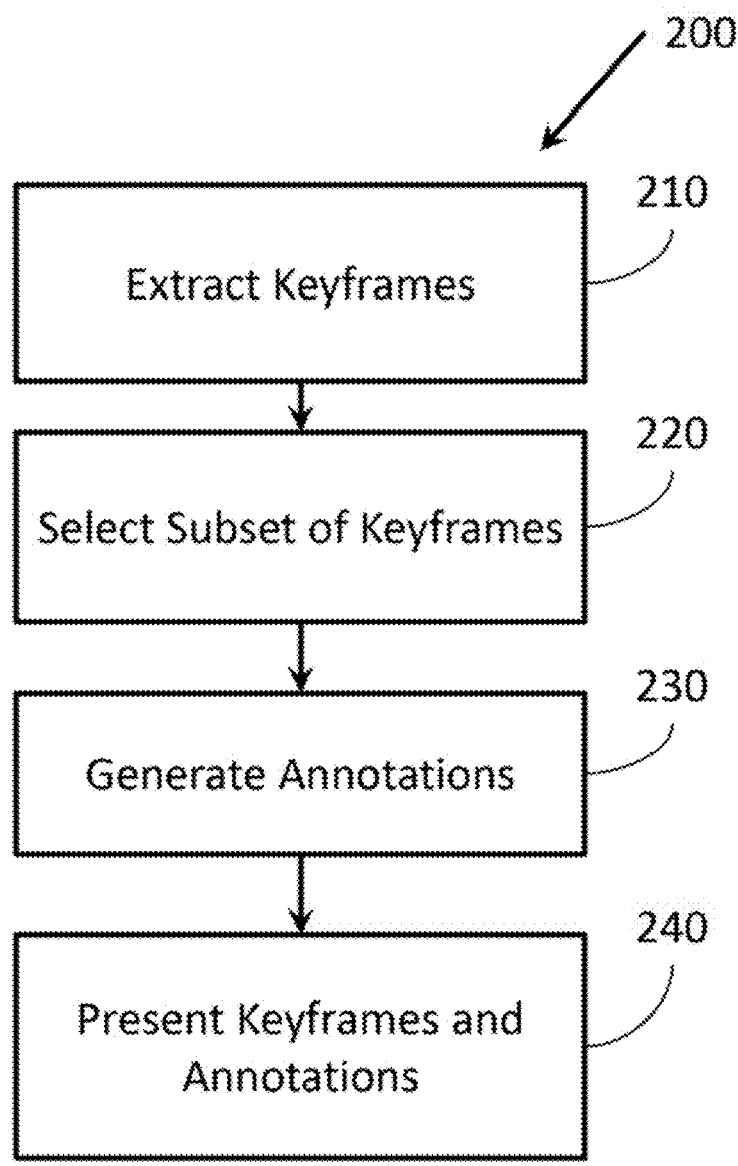
FIG. 2 illustrates a flowchart of example operations associated with keyframe annotation.

FIG. 2 illustrates an example method 200 associated with keyframe annotation. Method 200 may be embodied on a non-transitory computer-readable medium storing computer-executable instructions. The instructions, when executed by a computer, may cause the computer to perform method 200. In other examples, method 200 may exist within logic gates and/or RAM of an application specific integrated circuit (ASIC).

Method 200 includes extracting a set of keyframes from a video presentation at 210. As described above, many different techniques may be appropriate for extracting keyframes from video presentations. Further details of extracting keyframes from video presentations are described below with reference to FIG. 3.

Method 200 also includes selecting a subset of keyframes at 220. The subset of the keyframes may be selected for presentation to a user. The keyframes selected may be chosen based on a user preference. In various examples, the user preference may describe, for example, a preferred number of keyframes, a density of keyframes, and so forth.

Method 200 also includes generating annotations at 230. Annotations may be generated for the subset of the keyframes. The annotations may be personalized to the user. The annotations may be personalized to the user based on, for example, annotations previously endorsed by the user, specifications defined by the user, a user interaction, and so forth. The annotations previously endorsed by the user may include annotations associated with the video presentation, annotations associated with another video presentation, and so forth. Consequently, annotating the keyframes may include identifying annotations that are likely to be useful to the user based on their past behaviors.

The annotations themselves may be obtained from or generated based on, for example, annotations associated with the video presentation made by other users, annotations to the video presentation recommended by or to other users, text content extracted from the video, audio content extracted from the video, and so forth. Audio content extracted from the video may be converted to text via, for example, a speech to text application. Other techniques for generating the annotations may also be appropriate.

Method 200 also includes presenting the subset of the keyframes and the annotations at 240. The subset of the keyframes and the annotations may be presented to the user. In various example the subset of the keyframes and the annotations may be presented in a digital format (e.g., via a display of a computing device), in a textual format (e.g., printed out for the user), and so forth. Presenting the subset of the keyframes to the user may include providing references to portions of the video associated with members of the subset of the keyframes. By way of illustration, a keyframe presented via a digital media may be presented with a hyperlink to a portion of video presentation from which the keyframe was obtained. A keyframe presented via a print media may be presented with, for example, a quick response code that directs a computing device to access a portion of the video presentation from which the keyframe was obtained.

Figure 3:
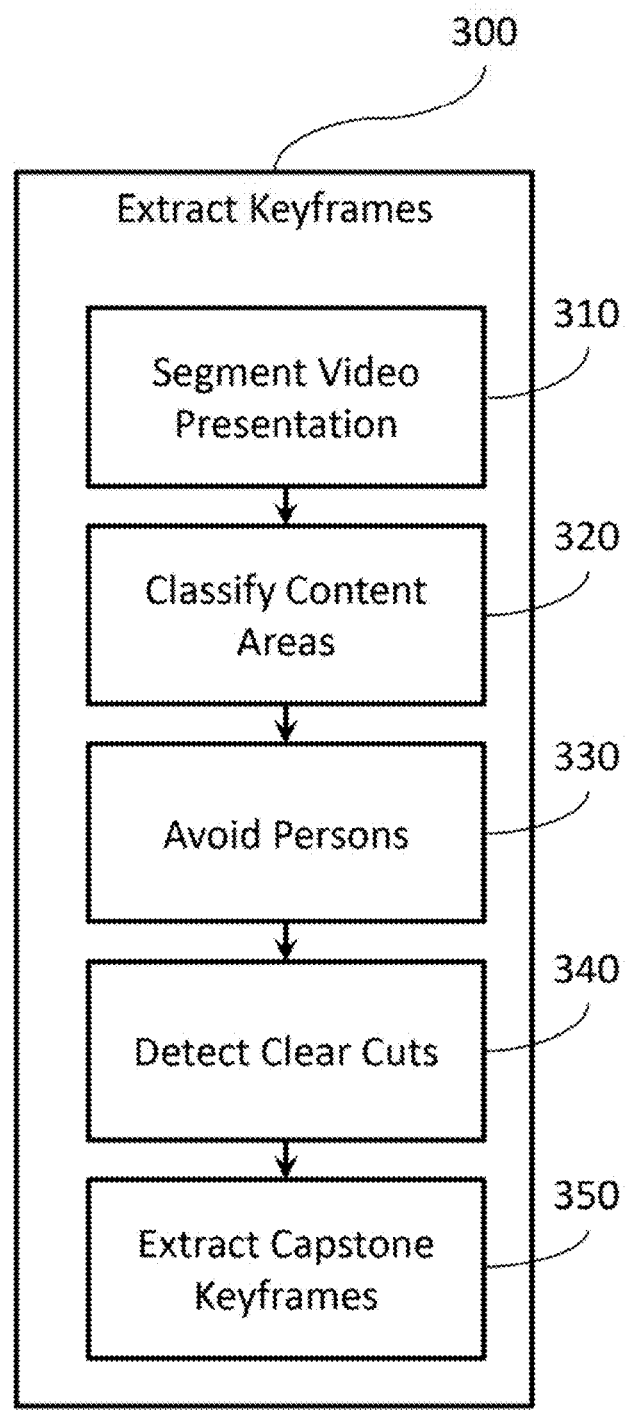
FIG. 3 illustrates another flowchart of example operations associated with keyframe annotation.

FIG. 3 illustrates a flowchart of example operations associated with keyframe annotation. In various examples, FIG. 3 may provide more detail into the operation of the keyframe extraction action 210 described above with reference to method 200 (FIG. 2).

Consequently, extracting keyframes 300 may include segmenting the video presentation at 310. The video presentation may be segmented into content areas. As described above, the content areas may be discrete portions of a video presentation that include different content of the video presentation that depends on how the video presentation was designed. Some video presentations, for example, may have a single content area including slides that are talked over by an instructor. Other video presentations may have several content areas including slides, a video of the instructor, a static area (either with or without content), and so forth.

Extracting keyframes 300 may also include classifying content areas at 320. The content areas may be classified based on subject matter appearing in the content areas. Thus, classifying the content areas may seek to specifically identify which portions of the video presentation contain presentation slides, which contain talking persons, and so forth.

Extracting the set of keyframes 300 also includes avoiding selecting as keyframes, video frames featuring a person at 330. This may be done by removing as potential keyframes, frames of the video presentation that feature a talking person. These frames may be identified by, for example, performing facial recognition on keyframes. Frames featuring a talking person may make inferior keyframes for video presentations because they do not contain pictographic content related to the subject matter of the video presentation.

Extracting the set of keyframes 300 also includes detecting a clear cut at 340. Clear cuts may be detected in a content area containing a presentation slide. Clear cuts may be detected using one of, histogram thresholds, template subtraction, grid division analysis, and so forth. Detecting clear cuts may facilitate identifying when presentation slides have advanced to a new slide. Because frames just prior to clear cuts may have more content than a new slide, the frames preceding clear cuts may be prioritized as keyframes.

Consequently extracting the set of keyframes 300 also includes extracting capstone keyframes at 350. The capstone keyframes from the video presentation may be frames just prior to a clear cut. This may facilitate maximizing content presented to a user in the keyframes provided to the user. As described above, keyframes may be presented to users with references to portions of the video presentation with which the keyframes are associated. When capstone keyframes are presented to a user with such a reference, the reference may cause the user to be directed to the beginning of the portion of the video from which the capstone keyframe is extracted. This portion of the video may be identified by, for example, detecting a previous clear cut, presentation content analysis (e.g., for when there are several clear cuts during the discussion of a single content slide), and so forth.

Figure 4:
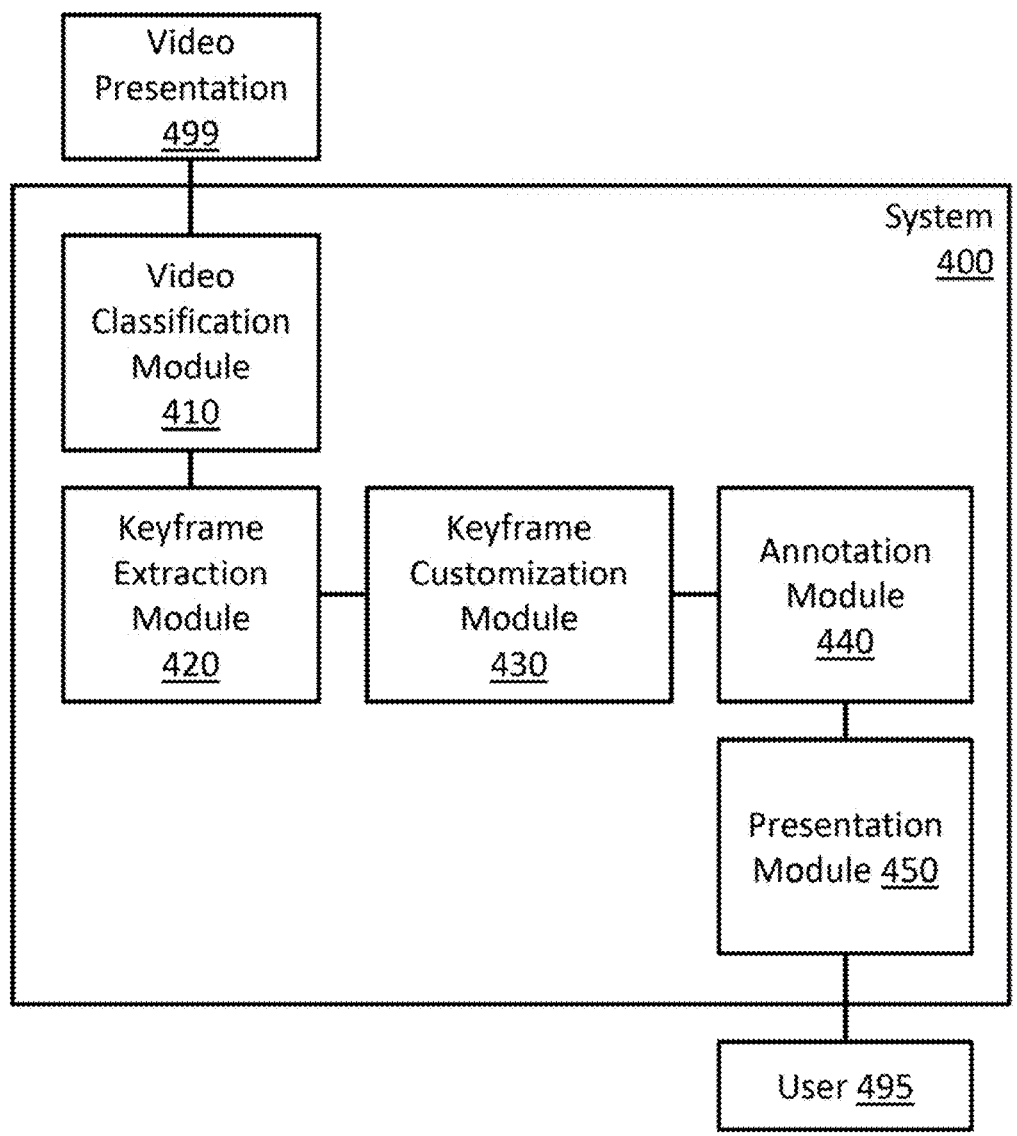
FIG. 4 illustrates an example system associated with keyframe annotation.

FIG. 4 illustrates a system 400 associated with keyframe annotation. System 400 includes a video classification module 410. Video classification module 410 may segment frames of a video presentation 499. The video presentation may be segmented into content areas. Video classification module 410 may also classify the content areas based on attributes of the content areas.

System 400 also includes a keyframe extraction module 420. Keyframe extraction module may extract extracted keyframes from video presentation 499. The extracted keyframes may be extracted based on clear cuts in a content area of video presentation 499 that contains a presentation slide. Thus, when a content area containing a presentation slide clear cuts to new content, frames surrounding the clear cut may be identified as candidates for being extracted as keyframes. In various examples, the extracted keyframes may be capstone keyframes.

System 400 also includes a keyframe customization module 430. Keyframe customization module 430 may select personalized keyframes from the extracted keyframes. The personalized keyframes may be selected for presentation to a user 495 based on user preferences.

System 400 also includes an annotation module 440. Annotation module 440 may generate annotations to the personalized keyframes. The annotations may be personalized to the user based on prior user behavior.

System 400 also includes a presentation module 450. Presentation module may provide the personalized keyframes and the annotations to user 495. In one example, the personalized keyframes and annotations may be provided to user 495 via a display of a computing device. The annotations may include hyperlinks that correspond to portions of the video presentation associated with the personalized keyframes. In another example, the personalized keyframes and annotations may be provided via a print media. In this example, the annotations may include quick response code images that correspond to portions of the video presentation associated with the personalized keyframes. In other examples, other overt markings, covert markings (e.g., watermarks), or other techniques (e.g., image recognition) may be used to link personalized keyframes with portions of videos.

Figure 5:
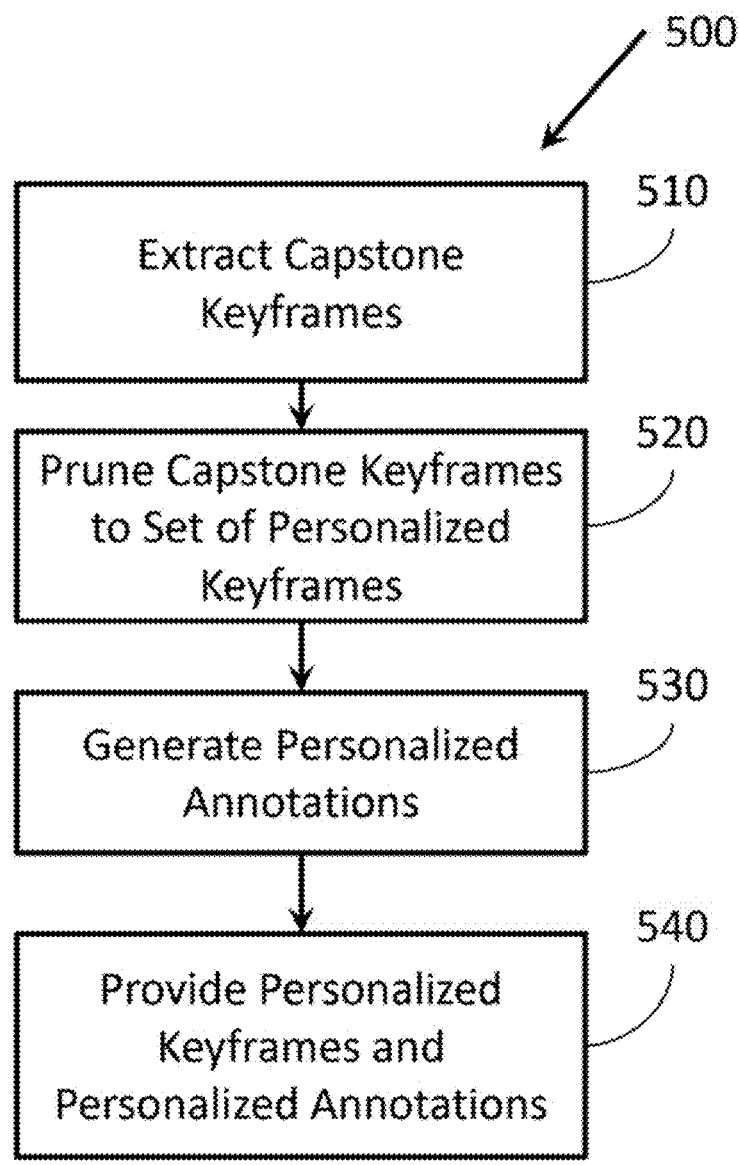
FIG. 5 illustrates another example flowchart of example operations associated with keyframe annotation.

FIG. 5 illustrates a method 500 associated with keyframe annotation. Method 500 includes extracting a set of capstone keyframes at 510. The capstone keyframes may be extracted from a video presentation. The capstone keyframes may be extracted based on clear cuts within the video presentation. Additionally, the set of capstone keyframes extracted may account for visual subject matter of the capstone keyframes. Accounting for visual subject matter may include, for example, avoiding extracting as a capstone keyframe, a video frame featuring a person.

Method 500 also includes pruning the capstone keyframes to a set of personalized keyframes at 520. The capstone keyframes may be pruned base on personalization settings associated with a user.

Method 500 also includes generating personalized annotations at 530. The personalized annotations may be generated for the personalized keyframes. The personalized annotations may be generated based on the personalization settings associated with the user. In various examples, the personalized annotations may be generated from annotations obtained from other users, annotations recommended to other users, text extracted from the video presentation, audio content extracted from the video, and so forth. The personalization settings used to generate the personalized annotations may include, for example, annotations previously endorsed by the user, specifications defined by the user, a user interaction, and so forth.

Method 500 also includes providing the personalized keyframes and the personalized annotations to the user at 540. As described above, the personalized keyframes and personalized annotations may be provided to the user via a print media, via an electronic media and so forth. Providing the personalized keyframes may also include providing the user references to the user that allow the user to quickly navigate to a portion of the video presentation associated with a corresponding keyframe.

Figure 6:
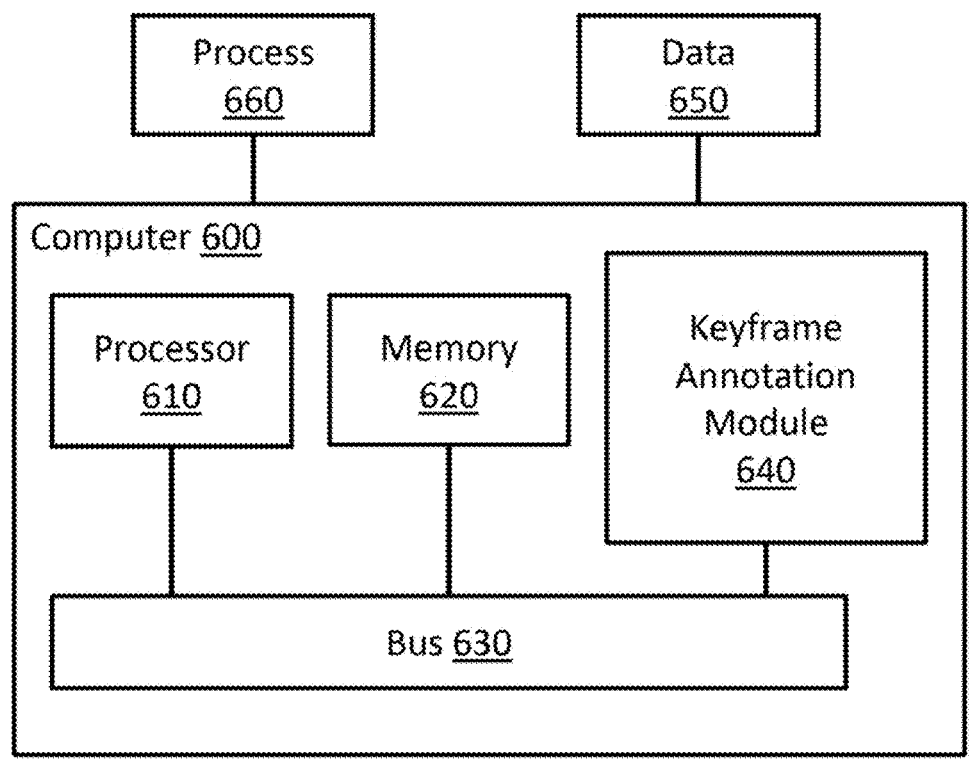
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. The computer 600 includes a keyframe annotation module 640. Keyframe annotation module 640 may perform, alone or in combination, various functions described above with reference to the example systems, methods, apparatuses, and so forth, in different examples, keyframe annotation module 640 may be implemented as a non-transitory computer-readable medium storing computer-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of various processors including dual microprocessor and other multi-processor architectures. Memory 620 may include non-volatile memory (e.g., read only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:
1. A method, comprising:
extracting a set of keyframes from a video presentation;
selecting a subset of the keyframes to present to a user based on a user preference;

generating annotations for the subset of the keyframes, where the annotations are personalized to the user; and presenting the subset of the keyframes and the annotations to the user.

2. The method of claim 1, where extracting the set of keyframes comprises:

segmenting the video presentation into content areas;

classifying the content areas based on subject matter appearing in the content areas; and avoiding extracting as keyframes, video frames featuring a person.

3. The method of claim 2, where extracting the set of keyframes comprises:

detecting a clear cut in a content area of the video presentation containing a presentation slide; and extracting as a capstone keyframe from the video presentation based on the clear cut.

4. The method of claim 3, where the clear cut is detected using one of histogram thresholds, template subtraction, and grid division analysis.

5. The method of claim 1, where the user preference describes one or more of, a preferred number of keyframes and a density of keyframes.

6. The method of claim 1, where the annotations are personalized to the user based on one of annotations previously endorsed by the user, specifications defined by the user, and based on a user interaction.

7. The method of claim 1, where the annotations are obtained from one or more of, annotations made by other users, annotations recommended to other users, text content extracted from the video, and audio content extracted from the video.

8. The method of claim 1, where presenting the subset of the keyframes to the user comprises providing references to portions of the video presentation associated with members of the subset of the keyframes.

9. A system, comprising:

a video classification module to segment frames of a video presentation into content areas and to classify the content areas based on attributes of the content areas;

a keyframe extraction module to extract extracted keyframes from the video presentation based on clear cuts in a content area of the video presentation containing a presentation slide;

a keyframe customization module to select personalized keyframes from the extracted keyframes for presentation to a user based on user preferences; and an annotation module to generate annotations to the personalized keyframes, where the annotations are personalized to the user based on prior user behavior; and a presentation module to provide the personalized keyframes and the annotations to the user.

10. The system of claim 9, where the personalized keyframes and annotations are provided via a display and where the annotations include hyperlinks that correspond to portions of the video presentation associated with the personalized keyframes.

11. The system of claim 9, where the personalized keyframes and annotations are provided via a print media, and where the annotations include quick response code images that correspond to portions of the video presentation associated with the personalized keyframes.

12. The system of claim 9, where the extracted keyframes are capstone keyframes.

13. A non-transitory computer-readable medium storing computer-executable instructions that when executed by a computer cause the computer to:

extract a set of capstone keyframes from a video presentation based on clear cuts within the video presentation, where the set of capstone keyframes extracted account for visual subject matter of the capstone keyframes;

prune the set of capstone keyframes to a set of personalized keyframes based on personalization settings associated with a user;

generate personalized annotations for the personalized keyframes based on the personalization settings; and provide the personalized keyframes and the personalized annotations to the user.

14. The non-transitory computer-readable medium of claim 13, where the personalized annotations are generated from annotations obtained from other users, annotations recommended to other users, text extracted from the video presentation, and audio content extracted from the video, and where the personalization settings used to generate the personalized annotations include one of, annotations previously endorsed by the user, specifications defined by the user, and a user interaction.

15. The non-transitory computer-readable medium of claim 13, where accounting for visual subject matter includes avoiding extracting as a capstone keyframe, a video frame featuring a person.

* * * * *